United States Patent
Pofahl et al.

(10) Patent No.: US 11,824,239 B2
(45) Date of Patent: Nov. 21, 2023

(54) METHOD FOR DETERMINING AN OPERATING STATE OF AN ELECTROCHEMICAL SYSTEM

(71) Applicant: AVL List GmbH, Graz (AT)

(72) Inventors: Stefan Pofahl, Graz (AT); Lukas Wielandner, Graz (AT)

(73) Assignee: AVL List GmbH, Graz (AT)

(*) Notice: Subject to any disclaimer, the term of this patent is extended or adjusted under 35 U.S.C. 154(b) by 591 days.

(21) Appl. No.: 16/770,600

(22) PCT Filed: Dec. 7, 2018

(86) PCT No.: PCT/AT2018/060288
§ 371 (c)(1),
(2) Date: Jun. 7, 2020

(87) PCT Pub. No.: WO2019/109120
PCT Pub. Date: Jun. 13, 2019

(65) Prior Publication Data
US 2021/0175528 A1 Jun. 10, 2021

(30) Foreign Application Priority Data
Dec. 7, 2017 (AT) .............................. A51019/2017

(51) Int. Cl.
*H01M 8/04537* (2016.01)
*H01M 8/04992* (2016.01)
*H01M 8/04082* (2016.01)

(52) U.S. Cl.
CPC ... *H01M 8/04559* (2013.01); *H01M 8/04201* (2013.01); *H01M 8/04589* (2013.01); *H01M 8/04992* (2013.01)

(58) Field of Classification Search
None
See application file for complete search history.

(56) References Cited

U.S. PATENT DOCUMENTS

| 6,472,090 B1 | 10/2002 | Colbow |
| 2005/0260463 A1* | 11/2005 | Chapman .......... H01M 8/04552 429/432 |

(Continued)

FOREIGN PATENT DOCUMENTS

| DE | 2044068 | 3/1972 |
| DE | 10053851 | 5/2002 |

(Continued)

OTHER PUBLICATIONS

Notification of Office Action and Search Report dated Oct. 31, 2022 From the State Intellectual Property Office of the People's Republic of China Re. Application No. 201880077555.2. (10 Pages).

(Continued)

*Primary Examiner* — Christopher P Domone

(57) ABSTRACT

The invention relates to a method for determining an operating state of an electrochemical system (1a; 1b; 1c; 1d; 1e), which has a cell stack (2) having at least one electrode portion (3, 4), at least one valve (5, 6, 20, 21) and at least one fluid line (23) being provided, the method comprising the following steps: conducting, in a varying manner, at least one fluid through the at least one valve (5, 6, 20, 21) via the at least one fluid line (23) with a predefined variation pattern, the variation pattern being applied to a fluid flow by means of the at least one valve (5, 6, 20, 21), determining a voltage response and/or a current response of the cell stack (2) during the varying conducting of the at least one fluid, and determining the operating state of the electrochemical system (1a; 1b; 1c; 1d; 1e) on the basis of the voltage response and/or the current response. The invention further relates to a computer program product (11), to a storage means (12), to a circuit assembly (13) and to an electrochemical system (1a; 1b; 1c; 1d; 1e).

17 Claims, 5 Drawing Sheets

(56) References Cited

U.S. PATENT DOCUMENTS

2008/0050620 A1* 2/2008 Frost ................ H01M 8/04179
429/432
2011/0008697 A1 1/2011 Nielsen et al.

FOREIGN PATENT DOCUMENTS

DE 102005023131 12/2005
EP 1447870 8/2004
WO WO 2019/109120 6/2019

OTHER PUBLICATIONS

Internationaler Recherchenbericht und Schriftlicher Bescheid [International Search Report and the Written Opinion] dated Mar. 1, 2019 From the International Searching Authority Re. Application No. PCT/AT2018/060288 and Its Translation of Search Report Into English. (12 Pages).

* cited by examiner

Prior art

METHOD FOR DETERMINING AN OPERATING STATE OF AN ELECTROCHEMICAL SYSTEM

RELATED APPLICATIONS

This application is a National Phase of PCT Patent Application No. PCT/AT2018/060288 having International filing date of Dec. 7, 2018, which claims the benefit of priority of Austrian Patent Application No. A51019/2017 filed on Dec. 7, 2017. The contents of the above applications are all incorporated by reference as if fully set forth herein in their entirety.

FIELD AND BACKGROUND OF THE INVENTION

The present invention relates to a method for determining an operating state of an electrochemical system. The invention furthermore relates to a computer program product, a storage medium having a computer program product stored thereon, a circuit arrangement having a computer program product installed thereon, and an electrochemical system.

Critical operating states can occur in electrochemical systems. Such a critical operating state can be, for example, the result of a hydrogen transfer in the case of an electrochemical system designed as an electrolyzer or an air depletion and/or fuel depletion in an electrochemical system designed as a fuel cell system.

Various methods are known from the prior art for monitoring an operating state of an electrical system and thus recognizing an occurrence of critical states early. For example, it is routine to carry out cell voltage monitoring (CVM). In this case, however, only voltages in a cell stack are monitored. Possible causes of a voltage deviation are not established, because of which it is also not possible to recognize critical operating states early and reliably.

To partially overcome these problems, circuit arrangements for imprinting alternating electrical signals in an electrochemical system by means of a regulating device have been developed. The imprinting of signals in electrochemical systems can be necessary, for example, upon the use of methods in which the operating state of the electrochemical system is to be inferred by measuring voltage and/or current signal responses. Such a method is known, for example, from the European patent application EP 1 646 101 A1, in which a predeterminable low-frequency current signal is imprinted or applied in a fuel cell stack and the operating state of the individual cells of a fuel cell stack can be inferred by the comparison to a response signal measured at the fuel cell stack, typically a voltage signal, in particular by comparison of the harmonic components of the two signals. In fuel cell stacks, which typically have a nonlinear current-voltage characteristic curve, the operating state of the fuel cell stack and thus accordingly the operating state of the electrochemical system can be inferred by the comparison of the harmonic components of the imprinted signal to the harmonic components of the response signal, which is distorted due to the nonlinear behavior of the fuel cell stack. According to EP 1 646 101 A1, a nonlinearity of a transmission link, which the response signal traverses to the fuel cell stack, cannot be compensated for, however. It can accordingly occur that an actual value of a signal to be imprinted, i.e., an actual signal, does not correspond to a target value of the signal to be imprinted.

SUMMARY OF THE INVENTION

The object of the present invention is to provide a more efficient method for determining an operating state of an electrochemical system. In particular, it is the object of the present invention to provide a method, a computer program product, a storage medium, and a circuit arrangement for simple, reliable, and cost-effective determination of an operating state of an electrochemical system, and also a corresponding electrochemical system, which represents an alternative to the prior art.

The above object is achieved by the patent claims. In particular, the above object is achieved by the method as claimed in claim 1, the computer program product as claimed in claim 10, the storage medium as claimed in claim 11, the circuit arrangement as claimed in claim 12, and the electrochemical system as claimed in claim 13. Further advantages of the invention result from the dependent claims, the description, and the drawings. In this case, features and details which are described in conjunction with the method obviously also apply in conjunction with the computer program product according to the invention, the storage medium according to the invention, the circuit arrangement according to the invention, the electrochemical system according to the invention and vice versa in each case, so that reference always is or can be made mutually with reference to the disclosure in relation to the individual aspects of the invention.

According to a first aspect of the present invention, a method is provided for determining an operating state of an electrochemical system. The electrochemical system comprises a cell stack having at least one electrode section, wherein at least one valve and at least one fluid line are provided. The method comprises the following steps:

varying guiding of at least one fluid via the at least one fluid line by the at least one valve using a predefined variation pattern, wherein the variation pattern is applied to a fluid stream by the valve, determining a voltage response and/or a current response of the cell stack during the varying guiding of the at least one fluid, and determining the operating state of the electrochemical system with the aid of the voltage response and/or current response.

The varying guiding of the at least one fluid using a predefined variation pattern is preferably to be understood as a cycled and/or pulsed guiding of the fluid in the electrochemical system. In the scope of the cycled guiding of the fluid, the fluid can be guided in a first cycle, no longer in a subsequent cycle, again thereafter, and so on. Furthermore, it is possible that the fluid is guided in a first cycle only using a predefined low guiding rate and is guided in a subsequent cycle using a predefined high supply rate, wherein the high guiding rate is higher than the low guiding rate. The different and/or varying guiding rates can differ periodically uniformly or can be varied unevenly in a predefined manner. The variation according to the invention of the guiding rate is preferably implemented by using cycled and/or pulsed valves (supply and/or outlet valves). Due to the use of such valves, no additional and/or adapted power electronics are required in the electrochemical system, which would have to be used for an electrical excitation. The method can thus be implemented easily and the system can accordingly be operated easily. Since valves according to the invention are generally already installed in generic electrochemical systems, a complex implementation in electrochemical systems can be omitted upon the use of the method according to the invention. For the case in which no valves according to the invention are installed or provided in an electrochemical system, these would be able to be retrofitted easily and cost-effectively, however. In the method according to the invention, at least one media flow is modeled or pulsed. This can take place either before the cell stack or after the cell stack. The fluid is thus cycled or pulsed by the valve itself, i.e., a predetermined frequency is applied thereto. Due to the excitation method according to the invention, modification to power electronics of the electrochemical system is not necessary.

The at least one valve for cycling a fluid stream is arranged in a fluid line. This valve can be arranged, for example, directly downstream or directly upstream from the cell stack. Alternatively, this valve can also be arranged in a fluid line formed as a supply line or drain line, by which a cycled or pulsed fluid is supplied to a fluid line or discharged from a fluid line, respectively, or metered in or metered out, respectively. A further option is to arrange the valve for pulsing or cycling a humidification. For this purpose, the valve is arranged in a bypass line, wherein the bypass line is a fluid line and can be designed and arranged for bypassing a semipermeable material exchanger such as a countercurrent humidifier. The fluid guided and cycled by the bypass line and the valve is supplied to the fluid line downstream from the semipermeable material exchanger and upstream from the cell stack, in particular from the anode section.

The electrochemical system is to be understood in particular as a system for converting chemically bound energy into electrical energy, for example, in the form of a fuel cell system, or a system for changing chemical compositions by means of electrical energy, for example, in the form of an electrolyzer. In this case, a further advantage of the present method is that it can be carried out independently of the operating mode of the electrochemical system, i.e., independently of whether the system will be or is operated or designed as a fuel cell system or as an electrolyzer. The fuel cell system can be a low-temperature fuel cell system, for example, a PEM fuel cell system.

A cell stack is understood in the scope of the invention as an electrochemical reactor, which comprises at least one electrode section or one electrode side. In particular, a cell stack comprises two electrode sides such as a cathode and an anode.

For example, the cell stack can be designed and arranged to carry out an electrolysis or as a galvanic cell.

The at least one electrode section can be an anode section and/or a cathode section of an electrochemical reactor such as a fuel cell stack or an SOEC system, wherein the electrochemical reactor corresponds to the cell stack in this case. A cycled or pulsed signal results due to the varying, in particular cycled or pulsed supply of the at least one fluid to the at least one electrode section. Due to the absence or at least the reduction of the fluid between the cycles or pulses, the fluid is consumed or at least partially consumed in the at least one electrode section unevenly over a duration of the pulse or the cycle and has to be transported to a respective electrode again during the next pulse, for example, by diffusion. If the excitation is performed, for example, by a square-wave signal (pulsed or cycled), the amplitude of the alternating component of the cell stack voltage is deflected in a sawtooth manner with the cycle frequency or pulse frequency and can accordingly be analyzed informatively.

The determination of the voltage response and/or current response is preferably to be understood as a detection or measurement of an alternating component of a mixed signal made up of voltage and current. In the scope of the determination of the voltage response and/or current response, the different concentrations of the fluids or media are determined at the at least one electrode section, i.e., the anode section and/or the cathode section. For this purpose, in particular the change of the fluid supply, for example, the change of the stoichiometry of the fluid, for example, of the reducing agent such as the fuel at the anode section and/or of the oxidizing agent such as the air at the cathode section, is determined. A determination of the operating state of the electrochemical system is to be understood in particular as a determination of the state of an electrode section, i.e., for example, of the anode section and/or the cathode section. In the scope of this determination, it can be established in particular whether an oxidizing agent depletion and/or a reducing agent depletion or a transfer between the fluids takes place. The application of a variation pattern can also be understood as an imprint of a variation pattern. The fluid stream substantially corresponds to the fluid, wherein in the scope of the invention, the fluid stream is always provided with a variation pattern.

In dependence on the determined operating state of the electrochemical system, a working fluid supply to an electrode section can be adapted, for example, in the form of air to a cathode section and/or fuel to an anode section.

It is favorable if at least one supply valve is provided upstream from the at least one electrode section and/or at least one outlet valve is provided downstream from the at least one electrode section, wherein at least one fluid is guided by the at least one supply valve and/or at least one outlet valve using a predefined variation pattern and a voltage response and/or a current response of the cell stack is determined during the varying guiding of the at least one fluid. The method according to the invention thus not only offers the advantage that no modification is necessary to the power electronics, but rather initial experiments also confirm an analysis capability superior to the prior art.

According to one refinement of the present invention, it is possible that the cell stack comprises a first electrode section in the form of an anode section and a second electrode section in the form of a cathode section, wherein a first supply valve is arranged upstream from the anode section and a second supply valve is arranged upstream from the cathode section. The method can comprise the following further steps in this design variant:

varying supply of a first fluid to the anode section by the first supply valve using a predefined first variation pattern, varying supply of a second fluid to the cathode section by the second supply valve using a predefined second variation pattern, wherein the first variation pattern differs from the second variation pattern, determining an anode-section-specific voltage response and/or current response of the cell stack during the varying supply of the first fluid to the anode section, determining a cathode-section-specific voltage response and/or current response of the cell stack during the varying supply of the second fluid to the cathode section, and determining the operating state of the electrochemical system with the aid of the anode-section-specific and/or cathode-section-specific voltage response and/or current response.

The operating state of the electrochemical system can thus be determined accompanying operation and/or online in a particularly detailed and ongoing manner. More precisely, the operating state in the anode section and the operating state in the cathode section can be determined essentially simultaneously. This operating state can be impaired, on the one hand, by media oversupply or undersupply or can be disturbed by media transfer via the cell membrane or cell wall. If different variation patterns are used, it can be reliably established later which signal comes from which electrode and which fluid stream or medium flow it corresponds to. It is thus possible to measure and calculate specifically for the anode section and specifically for the cathode section. In the event of an undesired fluid transfer or fluid depletion, the origin thereof can be tracked and/or found in the same manner. If the electrochemical system or the cell stack is excited using two different frequencies, they can also be detected in the corresponding signal response. The signal can be assigned to the anode section or the cathode section with the aid of the detected frequency. Subsequently, the amplitude profile of the corresponding frequencies can be reconstructed, whereby the changing fluid supply of the individual electrodes can be concluded.

Additionally or alternatively, it can be favorable if the cell stack comprises a first electrode section in the form of an anode section and a second electrode section in the form of a cathode section, and a first outlet valve is arranged downstream from the anode section and a second outlet valve is arranged downstream from the cathode section. The method can comprise the following further steps in this design variant:

varying discharge of a first fluid from the anode section by the first outlet valve using a predefined first variation pattern, varying discharge of a second fluid from the cathode section by the second outlet valve using a predefined second variation pattern, wherein the first variation pattern differs from the second variation pattern, determining an anode-section-specific voltage response and/or current response of the cell stack during the varying discharge of the first fluid from the anode section, determining a cathode-section-specific voltage response and/or current response of the cell stack during the varying discharge of the second fluid from the cathode section, and determining the operating state of the electrochemical system with the aid of the anode-section-specific and/or cathode-section-specific voltage response and/or current response.

In this case, the media flow is thus pulsed downstream from the cell stack. The modeling thereof thus takes place thereafter. The above-described advantages also apply to this variant, however, because of which it will not be discussed in greater detail.

In a further design variant, the cell stack comprises a first electrode section in the form of an anode section and a second electrode section in the form of a cathode section, and a first supply valve is arranged upstream from the anode section in a first supply line and a second supply valve is arranged upstream from the cathode section in a second supply line. The method can comprise the following further steps in this design variant:

varying supply of a first metered fluid in the first supply line by the first supply valve using a predefined first variation pattern to a first fluid in a first fluid line and in further sequence to the anode section, varying supply of a second metered fluid in the second supply line by the second supply valve using a predefined second variation pattern to a second fluid in a second fluid line and in further sequence to the cathode section, wherein the first variation pattern differs from the second variation pattern, determining an anode-section-specific voltage response and/or current response of the cell stack during the varying supply of the first fluid to the anode section, determining a cathode-section-specific voltage response and/or current response of the cell stack during the varying supply of the second fluid to the cathode section, and determining the operating state of the electrochemical system with the aid of the anode-section-specific and/or cathode-section-specific voltage response and/or current response.

In this variant, the pulsing or cycling of the fluids thus takes place via an arrangement of the valves in a respective independent inductor path.

Furthermore, it is possible that in a method according to the present invention, the first fluid is or comprises fuel or water and/or the second fluid is or comprises air. By supplying water, fuel, and/or air to the corresponding electrode, a process fluid is used which is located in the electrochemical system in any case. The method can thus accordingly be carried out easily. Hydrogen or a hydrocarbon such as methanol or ethanol can be used as a fuel. In general, the first fluid is a reducing agent and the second fluid is an oxidizing agent, wherein in particular the reducing agent is guided on the cathode side and the oxidizing agent is guided on the anode side. If the second fluid is air, water for humidification or nitrogen can thus be admixed to the air, for example. The fluids can also be inert, for example, hydrogen in a cathode path in an SOEC system.

Moreover, it is possible in a method according to the invention that the at least one fluid is guided using a cycling between Hz and 500 Hz, in particular between 3 Hz and 400 Hz, preferably between 4 Hz and 350 Hz. A cycling between 10 Hz and 30 Hz, in particular of approximately 3 Hz, has proven to be particularly advantageous. In this case, the cycling corresponds to a varying supply of the fluid. It has been shown in experiments in the scope of the present invention that this cycling is sufficient for an informative measurement result. Moreover, relatively cost-effective supply valves can be used.

In addition, it is possible that in a method according to the invention, the determination of the operating state of the electrochemical system is carried out during the operation of the electrochemical system continuously or automatically in predefined time windows. Malfunctions can always be recognized in a timely manner and possible damage can accordingly be prevented early due to a continuous monitoring of the electrochemical system. A data stream between a monitoring unit and a system control unit is reduced to scalar variables (indicators), for example, fuel depletion, due to an automated targeted and/or selected monitoring, for example, in predefined operating states of the electrochemical system. The indicators can be scaled, for example, as percentage values (100% applies entirely, 50% applies by half, 0% does not apply at all).

According to a further aspect of the present invention, a computer program product is provided, which is stored on a storage medium and is configured and designed for carrying out a method as claimed in any one of the preceding claims. The computer program thus provides the same advantages as have been described extensively with reference to the method according to the invention. The computer program product can be implemented as a computer-readable instruction code in any suitable programming language, for example, in JAVA or C++. The computer program product can be stored on a computer-readable storage medium such as a data disc, a removable drive, a volatile or nonvolatile memory, or an installed memory/processor. The instruction code can program a computer or other programmable devices in such a way that the desired functions are executed. Furthermore, the computer program product can be or is provided in a network, for example, the Internet, from which it can be downloaded by a user as needed. The computer program product can be or is implemented both by means of a computer program, i.e., software, and by means of one or more special electronic circuits, i.e., in hardware, or in any arbitrary hybrid form, i.e., by means of software components and hardware components.

A further aspect of the present invention relates to a storage medium having an above-described computer program product stored thereon. In addition, the invention relates to a circuit arrangement for an electrochemical system, which is configured and designed for carrying out a method as described above in detail. The storage medium and the circuit arrangement thus also provide the above-described advantages.

According to a further aspect of the present invention, an electrochemical system is provided. The electrochemical system comprises a cell stack having at least one electrode section, at least one supply valve, and/or at least one outlet valve, wherein the at least one supply valve is arranged upstream from the at least one electrode section for the varying supply of at least one fluid to the at least one electrode section and/or the at least one outlet valve is arranged downstream from the at least one electrode section for the varying discharge of at least one fluid from the at least one electrode section. The electrochemical system additionally comprises a circuit arrangement as described above.

The electrochemical system therefore also provides the above-explained advantages. A process fluid or process fluids are to be understood as fluids which are required for the operation of the electrochemical system. The process fluids can be air, water, fuel, biogas, methanol, ethanol, and/or further ones, wherein this list is not to be understood as exhaustive. The supply valve and/or outlet valve is preferably respectively designed as a cycled valve or as a pulsation valve.

It is favorable in this case if at least two fluid lines are provided, wherein at least one fluid line is formed as a supply line and the at least one supply valve is arranged in the supply line, wherein the supply line opens into a fluid line downstream from at least one flow rate regulator. A pulse or cycle can thus be applied to a process fluid before the cell stack, wherein this takes place in a separate supply line, in which preferably only a small part of a process fluid is guided. The process fluid to which a cycle/pulse is applied is mixed with the fluid line downstream from the flow rate regulator, whereby the large part of the process fluid is now also cycled.

It is furthermore advantageous in this case if the electrode unit comprises a first electrode section in the form of an anode section and a second electrode section in the form of a cathode section, wherein a first supply line and a second supply line are provided, wherein a first supply valve is arranged in the first supply line and a second supply valve is arranged in the second supply line and the first supply valve and the second supply valve are periodically cycled differently to supply the fluids, and wherein the first supply line opens upstream from the anode section into a first fluid line and the second supply line opens downstream from the cathode section into a second supply line. I.e., the first supply valve and the second supply valve are configured using different periodic variation patterns, wherein they are each arranged in a separate supply line. A particularly uniform and thus informative response signal for the correspondingly informative determination of the operating state can be generated by the periodicity.

In one preferred design variant, the cell stack comprises a first electrode section in the form of an anode section and a second electrode section in the form of a cathode section, wherein a first supply valve is arranged in a first supply line upstream from the anode section, wherein the first supply line opens downstream from a first flow rate regulator into a first fluid line for supplying a first fluid to the anode section, and a second supply valve is arranged in a second supply line upstream from the cathode section, wherein the second supply line opens downstream from a second flow rate regulator into a second fluid line for supplying a second fluid to the anode section, and wherein the first supply valve and the second supply valve are periodically cycled differently for guiding the fluids. I.e., the first supply valve and the second supply valve are configured using different periodic variation patterns. A particularly uniform and thus informative response signal for the correspondingly informative determination of the operating state can be generated by the periodicity.

In a further preferred design variant, the electrode unit comprises a first electrode section in the form of an anode section and a second electrode section in the form of a cathode section, wherein a first outlet valve for discharging a first fluid from the anode section is arranged downstream from the anode section and a second outlet valve for discharging a second fluid from the cathode section is arranged downstream from the cathode section, and wherein the first outlet valve and the second outlet valve are periodically cycled differently for discharging the fluids. I.e., the first outlet valve and the second outlet valve are configured using different periodic variation patterns. A particularly uniform and thus informative response signal for the correspondingly informative determination of the operating state can be generated by the periodicity.

BRIEF DESCRIPTION OF THE SEVERAL VIEWS OF THE DRAWINGS

Further measures improving the invention result from the following description of various exemplary embodiments of the invention, which are schematically illustrated in the figures. All features and/or advantages arising from the claims, the description, and/or the drawing, including design details and spatial arrangements, can be essential to the invention both as such and also in the various combinations.

In the respective schematic figures.

DESCRIPTION OF SPECIFIC EMBODIMENTS OF THE INVENTION

Elements having identical function and mode of action are each provided with the same reference signs in FIGS. 1 to 9.

Figure 1:
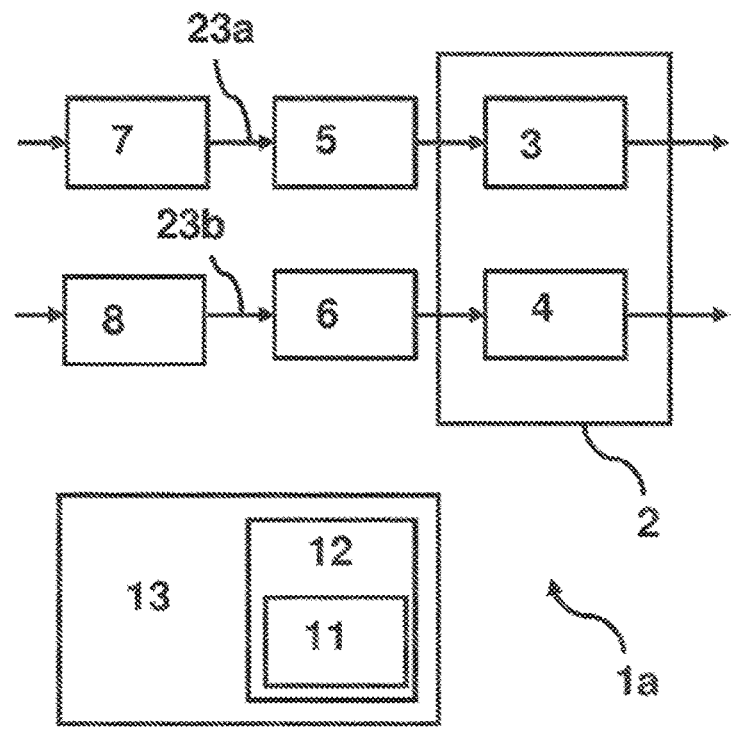
FIG. 1 shows a flow chart to explain a method according to a first embodiment of the present invention.

An electrochemical system 1a according to a first embodiment is illustrated in FIG. 1. The system 1a illustrated in FIG. 1 can be understood, for example, as a fuel cell system or at least as part of a fuel cell system. The cell stack 2 comprises a first and a second electrode section, for example, as anode section 3 and cathode section 4. A first supply valve 5 is arranged upstream from the anode section 3. A second supply valve 6 is arranged upstream from the cathode section 4. The supply valves 5, 6 are designed as cycled or pulsed valves for the varying supply of the respective process fluid to the associated electrode section 3, 4.

In addition, a first flow rate regulator 7 for controlling and/or regulating the fluid flow rate to the first supply valve is arranged upstream from the first supply valve 5. In addition, a second flow rate regulator 8 for controlling and/or regulating the fluid flow rate to the second supply valve 6 is arranged upstream from the second supply valve 6. A flushing valve 9 (not shown in FIG. 1) for flushing the anode region is arranged downstream from the anode section 3. The first supply valve 5 and the second supply valve 6 are periodically cycled differently for the differing varying supply of the respective process fluids. I.e., the first supply valve 5 is configured using a first variation pattern and the second supply valve 6 is configured using a second variation pattern, wherein the first variation pattern differs from the second variation pattern. A fluid line 23 is respectively provided between the flow rate regulators 7, 8, the supply valves 5, 6, and the cell stack 2 and also downstream from the cell stack 2, wherein a first fluid line 23a is arranged in the anode path and a second fluid line 23b is arranged in the cathode path.

The system 1a illustrated in FIG. 1 furthermore comprises a circuit arrangement 13 for controlling and/or regulating the system 1a. The circuit arrangement 13 comprises a storage medium 12 having a computer program product 11 stored and/or installed thereon. The computer program product 11 is configured to carry out methods which are described with reference to FIG. 3 and FIG. 4.

Figure 2:
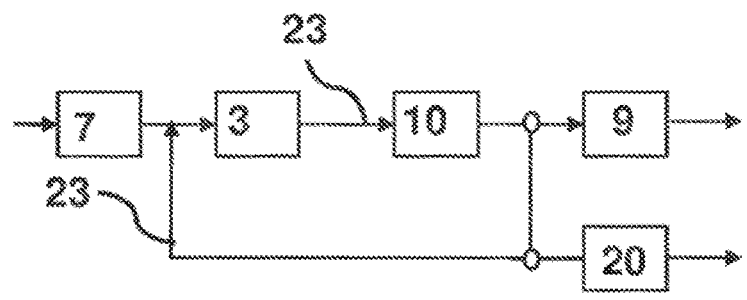
FIG. 2 shows a flow chart to explain a method according to a second embodiment of the present invention.
Figure 2:
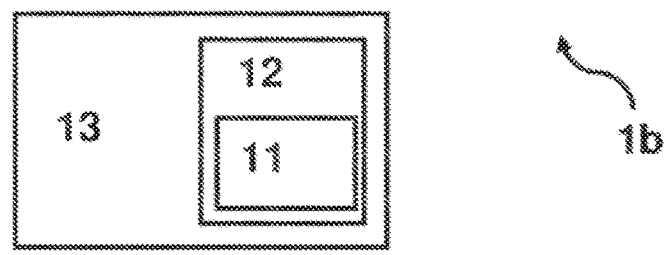

An electrochemical system 1b according to a second embodiment is illustrated in FIG. 2, in which only one cycled or pulsed outlet valve 20 is arranged. The illustration of a cathode section and/or a cell stack was omitted. A fluid pump 10 is arranged downstream from the anode section 3, wherein a flushing valve 9 is provided downstream from the fluid pump 10. The flushing valve 9 is arranged for flushing the anode region. The circuit arrangement 13 corresponds to the one which has already been described with respect to the first embodiment. A fluid line 23 is again provided between the individual elements of the electrochemical system 1b. The circuit arrangement 13 corresponds to the one from FIG. 1. The anode section 3 can in principle also be formed as a cathode section.

Figure 3:
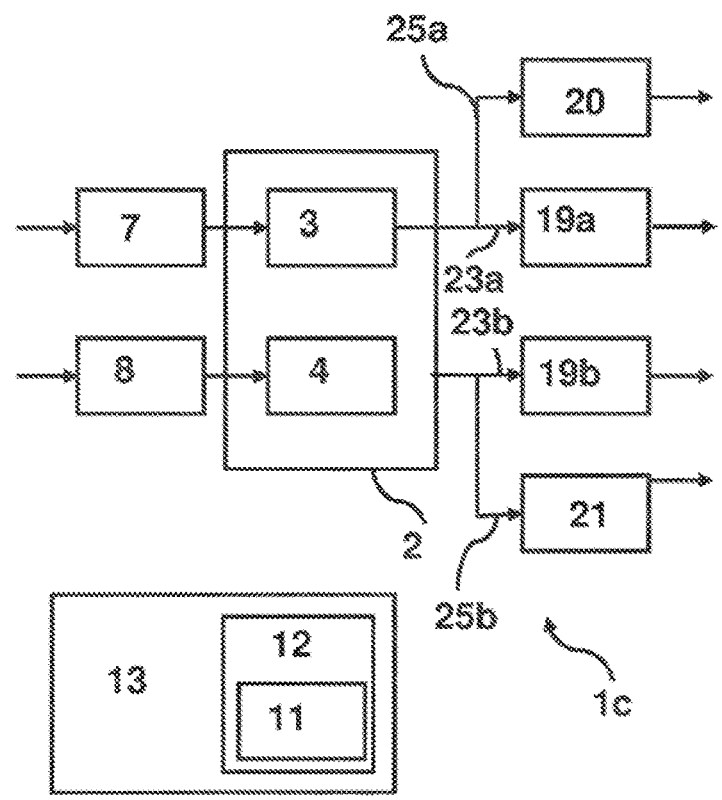
FIG. 3 shows a flow chart to explain a method according to a third embodiment of the present invention.

FIG. 3 shows a further electrochemical system 1c, in which a pulsed/cycled first outlet valve 20 and a pulsed/cycled second outlet valve 21 are provided, wherein the first outlet valve 20 is arranged downstream from the anode section 3 and the second outlet valve 21 is arranged downstream from the cathode section 4. The outlet valves 20, 21 are each arranged in this case in a drain line 25a, 25b. The first drain line 25a separates from the first fluid line 23a downstream from the anode section 3 and the second drain line 25b separates from the second fluid line 23b downstream from the cathode section 4. An overflow valve 19, which can be designed as a pressure retention valve, is arranged in the respective fluid lines 23a, 23b. The circuit arrangement 13 again corresponds to the one from the other exemplary embodiments.

Figure 4:
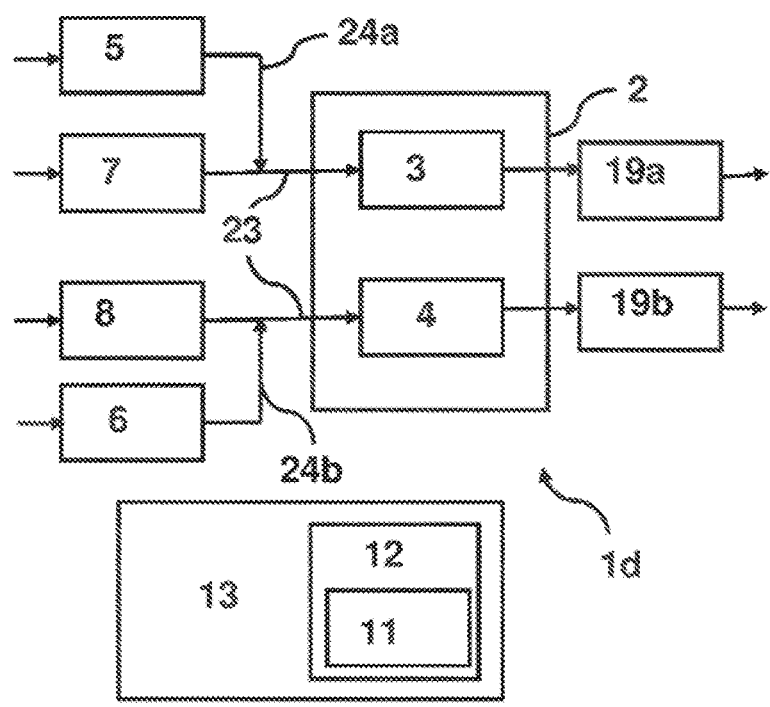
FIG. 4 shows a flow chart to explain a method according to a fourth embodiment of the present invention.

An electrochemical system 1d according to a fourth embodiment is shown in FIG. 4. A first supply line 24a or a second supply line 24b is arranged upstream from the anode section 3 or the cathode section 4, respectively, in each of which a supply valve 5, 6 is provided. The respective supply line 24a, 24b unifies upstream from the cell stack 2 and downstream from a respective flow rate regulator 5, 6 with a first fluid line 23a or a second fluid line 23b, respectively. The flow rate regulators 5, 6 are essentially valves and can each also be designed as solenoid valves. Two overflow valves are also provided downstream from the cell stack 2 in FIG. 4, which are used during operation in overpressure. The circuit arrangement 13 again corresponds to the one of the other exemplary embodiments.

Figure 5:
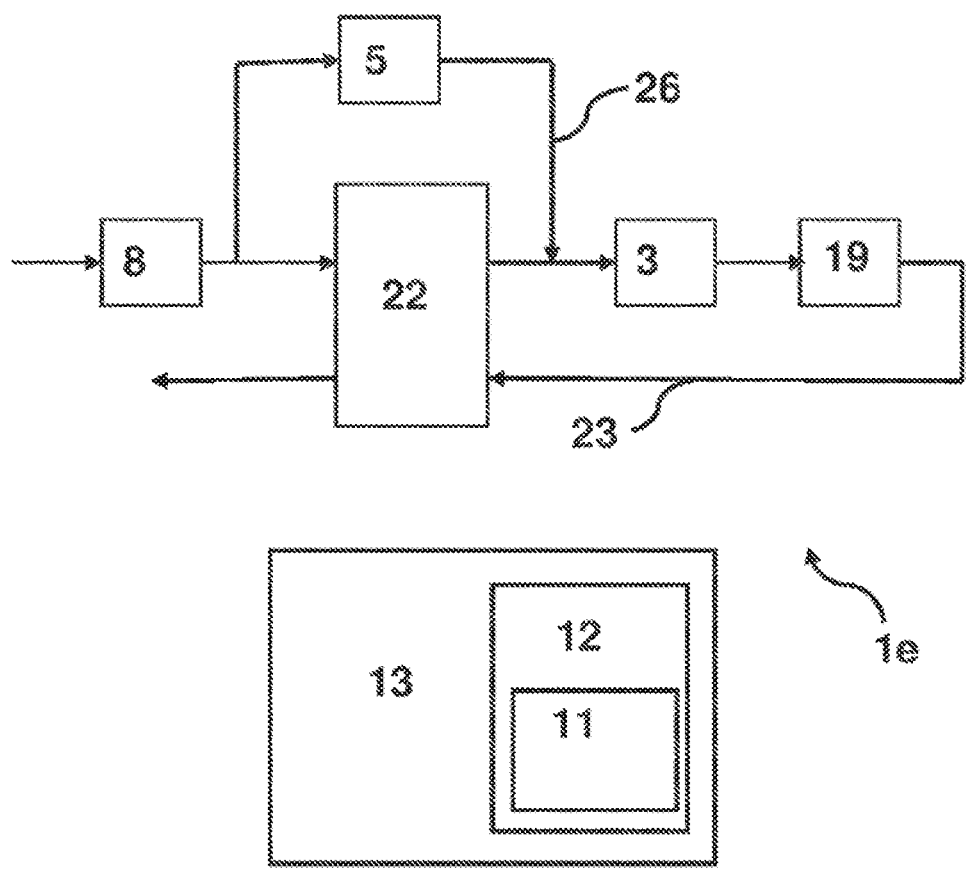
FIG. 5 shows a flow chart to explain a method according to a fifth embodiment of the present invention.

FIG. 5 shows an electrochemical system 1e according to a fourth embodiment. In this case, the valve 5 is for pulsing or cycling a humidification and is arranged in a bypass line 26, wherein the bypass line 26 corresponds to a fluid line 23 and is designed and arranged for bypassing a semipermeable material exchanger 22. Fluid guided and cycled by the bypass line 26 and the valve 5 is supplied downstream from a semipermeable material exchanger 22 and upstream from the cell stack 2, in particular the anode section 3, to the fluid line 23. An overflow valve 19 is arranged downstream from the anode section 3, wherein the fluid line 23 fluidically connects the overflow valve 19 to the semipermeable material exchanger 22. The circuit arrangement 13 again corresponds to the one of the other exemplary embodiments.

The various exemplary embodiments can also be at least partially combined with one another. It is also to be explicitly noted that a fuel cell system such as a PEMFC is only one possible exemplary embodiment. For example, the electrochemical system can also be designed as an SOEC system, wherein in this variant the design of the electrode sections (cathode region 4 or anode region 3) is precisely reversed in relation to a design as a fuel cell system.

Figure 6:
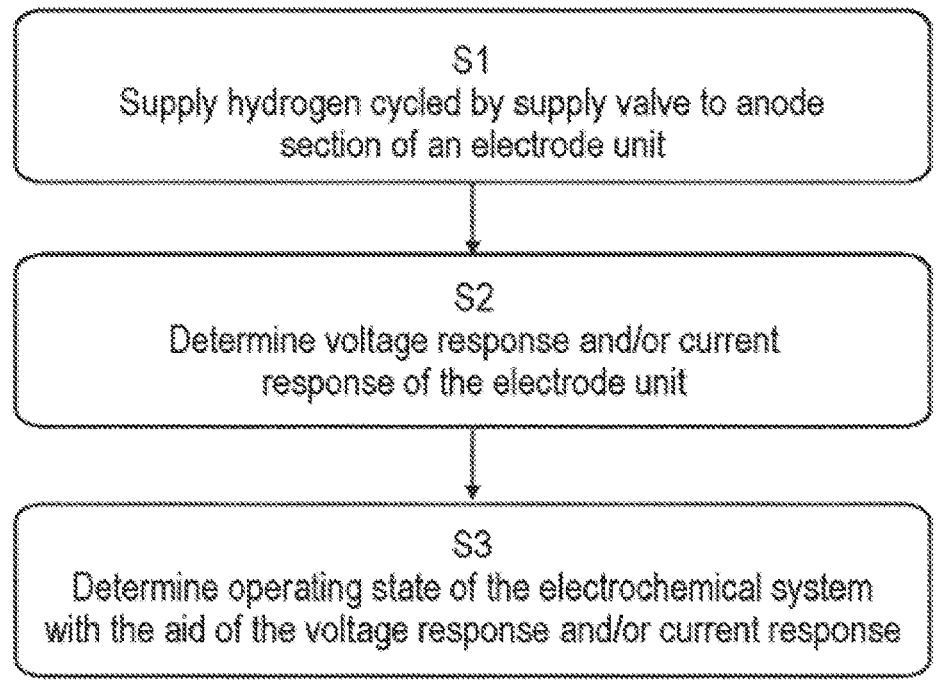
FIG. 6 shows a block diagram to illustrate an electrochemical system according to a first embodiment of the present invention.

FIG. 6 shows a flow chart to explain a method for determining an operating state in an electrochemical system 1a, 1b, 1c, 1d, 1e illustrated as in FIG. 1 to FIG. 5 according to an exemplary first embodiment. In a first step S1, a fluid or a process fluid in the form of hydrogen is supplied by a supply valve 5 pulsed at 30 Hz in an accordingly varying manner to the anode section 3 of the cell stack 2. In a second step S2, a voltage response and/or current response of the cell stack 2 is determined or measured. In a following third step S3, the measured values are evaluated and analyzed (for example, via a THDA method or another suitable method) and the operating state of the electrochemical system 1a, 1b is determined with the aid of the voltage response and/or current response. In this case, predefined algorithms can determine and/or compute an indicator profile (reference sign 14 in FIG. 8). In the event of changes of the indicator, the circuit arrangement 13 can be activated accordingly to adapt the hydrogen flow.

Figure 7:
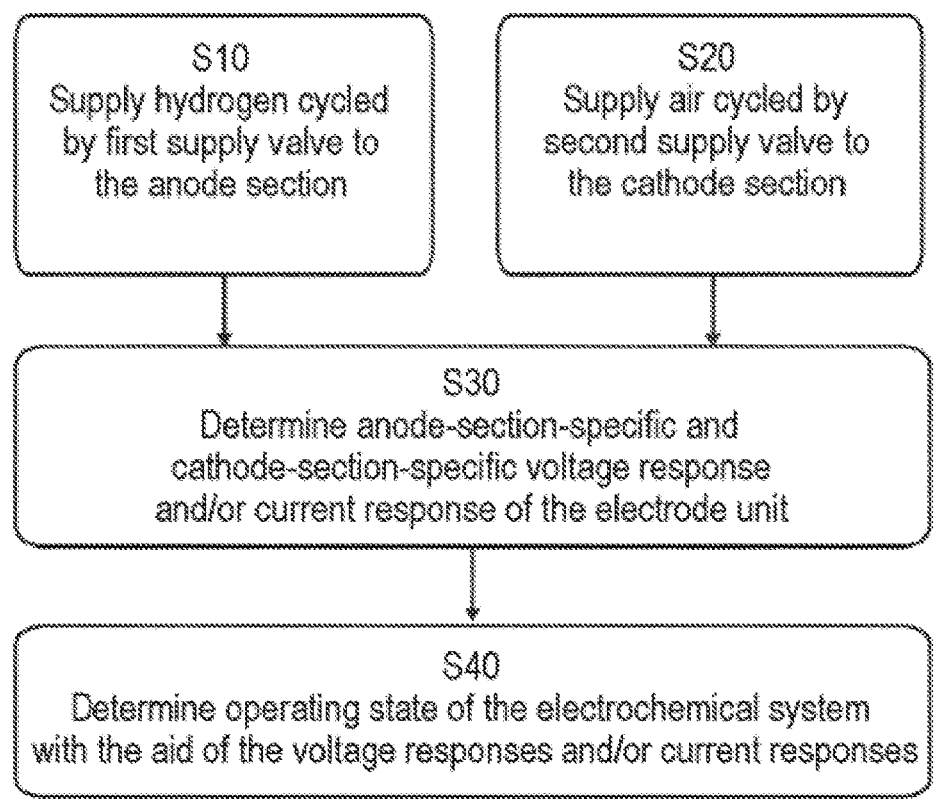
FIG. 7 shows a block diagram to illustrate an electrochemical system according to a second embodiment of the present invention.

A method for determining an operating state of an electrochemical system 1b according to a second embodiment is described with reference to FIG. 7. In a first step S10, a process fluid in the form of hydrogen is supplied by a first supply valve 5 pulsed at 20 Hz in a correspondingly varying manner to the anode section 3 of the cell stack 2. Moreover, in an at least partially simultaneously running second step S20, a process fluid in the form of, for example, air is supplied by a second supply valve 6 pulsed at 40 Hz in a correspondingly varying manner to the cathode section 4 of the cell stack 2. Subsequently to or during this, in a third step S30, an anode-section-specific voltage response and/or current response of the cell stack 2 and a cathode-section-specific voltage response and/or current response of the cell stack 2 are measured. This is possible since the electrodes 3, 4 are excited using two different frequencies, which can be detected in the signal response. In a fourth step S40, the operating state of the electrochemical system 1b can now be determined with the aid of the anode-section-specific and/or cathode-section-specific voltage responses and/or current responses.

Figure 8:
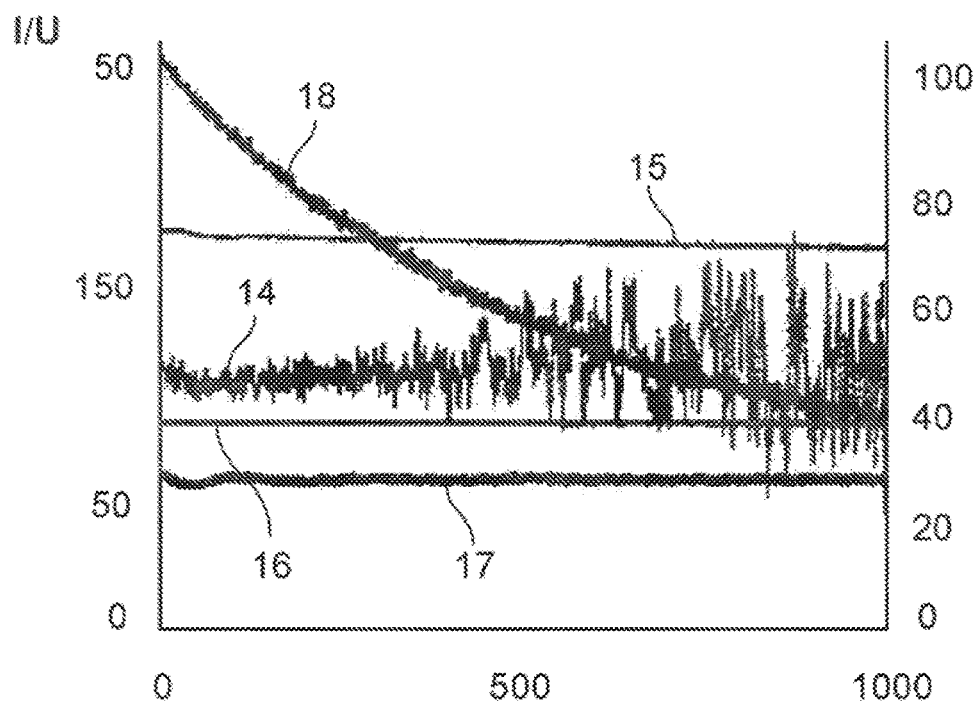
FIG. 8 shows a diagram to explain a characteristic curve profile known in the prior art.
Figure 9:
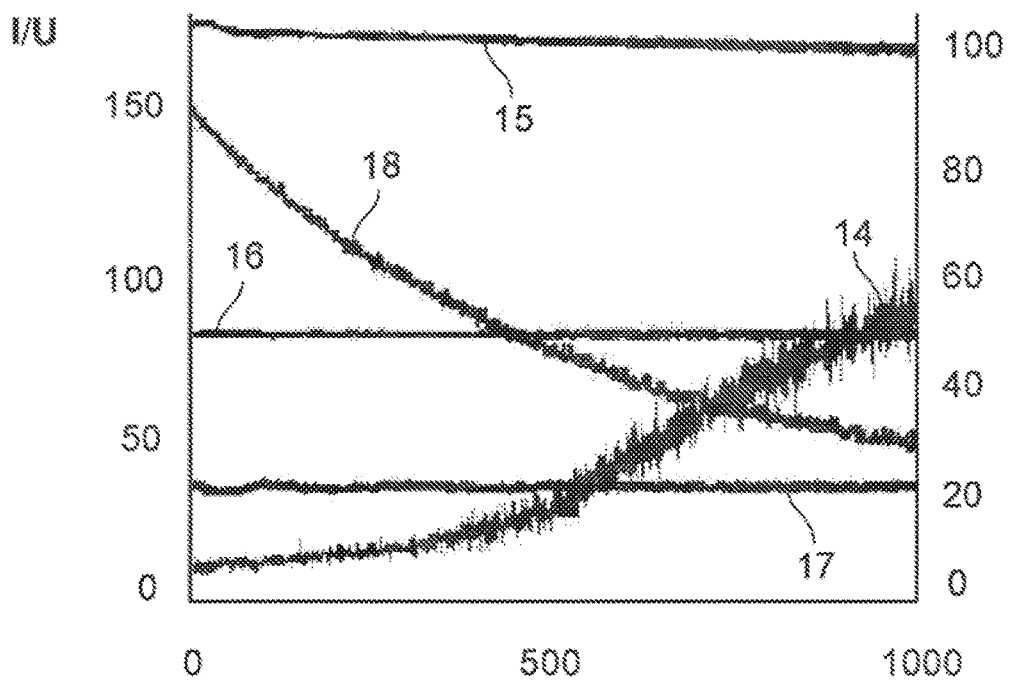
FIG. 9 shows a diagram to explain a characteristic curve profile according to the invention.

The advantage of the method according to the invention in relation to the methods previously typical in the prior art are to be emphasized with reference to FIG. 8 and FIG. 9. FIG. 8 and FIG. 9 each show a diagram having a current axis (I/A) or a voltage axis (U/V), respectively, which abut a time axis (s). In the diagrams, a process medium indicator 14, a stack voltage 15, current 16, a stoichiometry of the oxygen 17 scaled by 10 (lambda multiplied by 10), and a hydrogen concentration 18 are shown in each case, wherein the process medium indicator (0% to 100%) is to be highlighted. As can be seen in FIG. 8, the process medium indicator 14 shows an amplitude profile, which increases overall over time with deflections upward and downward. The process medium indicator 14 resulting in FIG. 9, in contrast, shows an amplitude profile which uniformly rises upward over time. Such a profile can be recognized significantly more easily and reliably in comparison to the profile illustrated in FIG. 8 as a corresponding notification or indicator of the operating state of the electrochemical system 1a, 1b, 1c, 1d.

In addition to the illustrated embodiments, the invention permits further design principles. I.e., the present invention is not to be considered to be restricted to the illustrated figures.

LIST OF REFERENCE SIGNS 1a, 1b fuel cell system
2 cell stack
3 anode (electrode section)
4 cathode (electrode section)
5 supply valve
6 supply valve
7 flow rate regulator
8 flow rate regulator
9 flushing valve
10 fluid pump
11 computer program product
12 storage medium
13 circuit arrangement
14 process medium indicator
15 stack voltage
16 current
17 stoichiometry ratio
18 hydrogen quantity
19 overflow valve
19a overflow valve
19b overflow valve
20 outlet valve
21 outlet valve
22 semipermeable material exchanger
23 fluid line
23a fluid line
23b fluid line
24a supply line
24b supply line
25a drain line
25b drain line
26 bypass line

The invention claimed is:

1. A method for determining an operating state of an electrochemical system (1a; 1b; 1c; 1d; 1e), which comprises a cell stack (2) having at least one electrode section (3, 4), wherein at least one valve (5, 6, 20, 21) and at least one fluid line (23) are provided, comprising the following steps:
varying guiding of at least one fluid via the at least one fluid line (23) by the at least one valve (5, 6, 20, 21) using a predefined variation pattern, wherein the variation pattern is applied to a fluid stream by the at least one valve (5, 6, 20, 21),
determining a voltage response and/or a current response of the cell stack (2) during the varying guiding of the at least one fluid, and
determining the operating state of the electrochemical system (1a; 1b; 1c; 1d; 1e) with the aid of the voltage response and/or current response.

2. The method as claimed in claim 1, wherein at least one supply valve (5, 6) is provided upstream from the at least one electrode section (3, 4) and/or at least one outlet valve (20, 21) is provided downstream from the at least one electrode section (3, 4), wherein at least one fluid is guided varying with a predefined variation pattern by the at least one supply valve (5, 6) and/or at least one outlet valve (20, 21) and a voltage response and/or a current response of the cell stack (2) during the varying guiding of the at least one fluid is determined.

3. The method as claimed in claim 1, wherein the cell stack (2) comprises a first electrode section in the form of an anode section (3) and a second electrode section in the form of a cathode section (4), and a first supply valve (5) is arranged upstream from the anode section (3) and a second supply valve (6) is arranged upstream from the cathode section (4), comprising the following further steps:
varying supply of a first fluid to the anode section (3) by the first supply valve (5) using a predefined first variation pattern,
varying supply of a second fluid to the cathode section (4) by the second supply valve (6) using a predefined second variation pattern, wherein the first variation pattern differs from the second variation pattern,
determining an anode-section-specific voltage response and/or current response of the cell stack (2) during the varying supply of the first fluid to the anode section (3),
determining a cathode-section-specific voltage response and/or current response of the cell stack (2) during the varying supply of the second fluid to the cathode section (4), and
determining the operating state of the electrochemical system (1a; 1b; 1c; 1d; 1e) with the aid of the anode-section-specific and/or cathode-section-specific voltage response and/or current response.

4. The method as claimed in claim 1,
wherein
the cell stack (2) comprises a first electrode section in the form of an anode section (3) and a second electrode section in the form of a cathode section (4), and a first outlet valve (20) is arranged downstream from the anode section (3) and a second outlet valve (21) is arranged downstream from the cathode section (4), comprising the following further steps:
varying discharge of a first fluid from the anode section (3) by the first outlet valve (20) using a predefined first variation pattern,
varying discharge of a second fluid from the cathode section (4) by the second outlet valve (21) using a predefined second variation pattern, wherein the first variation pattern differs from the second variation pattern,
determining an anode-section-specific voltage response and/or current response of the cell stack (2) during the varying discharge of the first fluid from the anode section (3),
determining a cathode-section-specific voltage response and/or current response of the cell stack (2) during the varying discharge of the second fluid from the cathode section (4), and
determining the operating state of the electrochemical system (1a; 1b; 1c; 1d; 1e) with the aid of the anode-section-specific and/or cathode-section-specific voltage response and/or current response.

5. The method as claimed in claim 1, wherein the cell stack (2) comprises a first electrode section in the form of an anode section (3) and a second electrode section in the form of a cathode section (4) and a first supply valve (5) is arranged in a first supply line (24a) upstream from the anode section (3) and a second supply valve (6) is arranged in a second supply line (24b) upstream from the cathode section (4), comprising the following further steps:
varying supply of a first metered fluid in the first supply line (24a) by the first supply valve (5) using a predefined first variation pattern to a first fluid in a first fluid line (23a) and in further sequence to the anode section (3),
varying supply of a second metered fluid in the second supply line (24b) by the second supply valve (6) using a predefined second variation pattern to a second fluid in a second fluid line (23b) and in further sequence to the cathode section (4), wherein the first variation pattern differs from the second variation pattern,
determining an anode-section-specific voltage response and/or current response of the cell stack (2) during the varying supply of the first fluid to the anode section (3),
determining a cathode-section-specific voltage response and/or current response of the cell stack (2) during the varying supply of the second fluid to the cathode section (4), and
determining the operating state of the electrochemical system (1a; 1b; 1c; 1d; 1e) with the aid of the anode-section-specific and/or cathode-section-specific voltage response and/or current response.

6. The method as claimed in claim 3, wherein the first fluid is or comprises a fuel or water and/or the second fluid is or comprises air, wherein the first and the second fluid are each guided in one fluid line (23a, 23b).

7. The method as claimed in claim 1, wherein the at least one fluid is guided using a cycling between 1 Hz and 500 Hz.

8. The method as claimed in claim 1, wherein the electrochemical system (1a; 1b; 1c; 1d; 1e) is a fuel cell or an electrolyzer.

9. The method as claimed in claim 1, wherein the determination of the operating state of the electrochemical system (1a; 1b; 1c; 1d; 1e) is carried out continuously or automatically in predefined time windows during the operation of the electrochemical system (1a; 1b; 1c; 1d; 1e).

10. A computer program product (11), which is stored on a storage medium (12) and is configured and designed for carrying out a method as claimed in claim 1.

11. A storage medium (12) having a computer program product (11) as claimed in claim 10 stored thereon.

12. A circuit arrangement (13) for an electrochemical system (1a; 1b; 1c; 1d; 1e), which is configured and designed to carry out a method as claimed in claim 1.

13. An electrochemical system (1a; 1b; 1c; 1d; 1e), comprising a cell stack (2) having at least one electrode section (3, 4), at least one supply valve (5, 6), and/or at least one outlet valve (20, 21), at least one fluid line (23), wherein the at least one supply valve (5, 6) is arranged in the fluid line (23) and upstream from the at least one electrode section (3, 4) for the varying supply of at least one fluid to the at least one electrode section (3, 4) and/or the at least one outlet valve (20, 21) is arranged in the fluid line (23) and downstream from the at least one electrode section (3, 4) for the varying discharge of at least one fluid from the at least one electrode section (3, 4), and a circuit arrangement (13) as claimed in claim 12.

14. The electrochemical system (1a; 1b; 1c; 1d; 1e) as claimed in claim 13, wherein at least two fluid lines (23a, 24a) are provided, wherein at least one fluid line is formed as a supply line (24a) and the at least one supply valve (5) is arranged in the supply line (24a), wherein the supply line (24a) opens into a fluid line (23a) downstream from at least one flow rate regulator (7).

15. The electrochemical system (1a; 1b; 1c; 1d; 1e) as claimed in claim 14,
wherein the electrode unit (2) comprises a first electrode section in the form of an anode section (3) and a second electrode section in the form of a cathode section (4), wherein a first supply line (24a) and a second supply line (24b) are provided, wherein a first supply valve (5) is arranged in the first supply line (24a) and a second supply valve (6) is arranged in the second supply line (24b) and the first supply valve (5) and the second supply valve (6) are periodically cycled differently for guiding the fluids, and wherein the first supply line (24a) opens into a first fluid line (23a) upstream from the anode section (3) and the second supply line (24b) opens into a second supply line (24b) downstream from the cathode section (4).

16. The electrochemical system (1a; 1b; 1c; 1d; 1e) as claimed in claim 13,
wherein the cell stack (2) comprises a first electrode section in the form of an anode section (3) and a second electrode section in the form of a cathode section (4), wherein a first supply valve (5) is arranged in a first supply line (24a) upstream from the anode section (3), wherein the first supply line (24a) opens downstream from a first flow rate regulator (7) into a first fluid line (23a) for supplying a first fluid to the anode section (3), and a second supply valve (6) is arranged upstream from the cathode section (4) in a second supply line (24b), wherein the second supply line (24b) opens downstream from a second flow rate regulator (8) into a second fluid line (23b) for supplying a second fluid to the anode section (3), and wherein the first supply valve (5) and the second supply valve (6) are periodically cycled differently for guiding the fluids.

17. The electrochemical system (1*a*; 1*b*; 1*c*; 1*d*; 1*e*) as claimed in claim 13,
wherein the electrode unit (2) comprises a first electrode section in the form of an anode section (3) and a second electrode section in the form of a cathode section (4), wherein a first outlet valve (20) for discharging a first fluid from the anode section (3) is arranged downstream from the anode section (3) and a second outlet valve (21) for discharging a second fluid from the cathode section (4) is arranged downstream from the cathode section (4), and wherein the first outlet valve (20) and the second outlet valve (21) are periodically cycled differently for discharging the fluids.

* * * * *